United States Patent [19]

Combs et al.

[11] Patent Number: 5,162,663

[45] Date of Patent: Nov. 10, 1992

[54] SELECTIVE OUTPUT DISCONNECT FOR A SINGLE TRANSFORMER CONVERTER

[75] Inventors: Scott A. Combs, Central, S.C.; Luis A. Diaz, Apopka, Fla.

[73] Assignee: NCR Corporation, Dayton, Ohio

[21] Appl. No.: 589,745

[22] Filed: Sep. 28, 1990

[51] Int. Cl.[5] .......................... H02J 7/02; H02J 9/00; H02M 1/10

[52] U.S. Cl. ........................... 307/29; 307/46; 307/58; 307/66; 307/242; 363/21

[58] Field of Search ............... 307/17, 29, 38, 39, 307/45, 46, 58, 64, 82, 85, 32, 75, 640, 242, 72, 30, 31, 24, 28, 66; 323/271, 272; 363/67, 21

[56] References Cited

U.S. PATENT DOCUMENTS

| | | | |
|---|---|---|---|
| 3,743,850 | 7/1973 | Davis | 307/32 |
| 4,034,232 | 7/1977 | La Venture | 307/32 |
| 4,163,906 | 8/1979 | Shimamura | 307/39 |
| 4,194,147 | 3/1980 | Payne et al. | 323/17 |
| 4,205,235 | 5/1980 | Pal et al. | 290/44 |
| 4,323,789 | 4/1982 | Dion | 307/81 |
| 4,323,962 | 4/1982 | Steigerwald | 363/127 |
| 4,628,426 | 12/1986 | Steigerwald | 363/17 |
| 4,695,936 | 9/1987 | Whittle | 363/21 |
| 4,716,488 | 12/1987 | Segger | 361/88 |
| 4,744,020 | 5/1988 | Cavagnolo | 363/21 |
| 4,745,538 | 5/1988 | Cross et al. | 363/21 |
| 4,814,963 | 3/1989 | Petersen | 363/20 |
| 4,926,303 | 5/1990 | Sturgeon | 363/21 |

Primary Examiner—A. D. Pellinen
Assistant Examiner—Richard Elms
Attorney, Agent, or Firm—Jack R. Penrod

[57] ABSTRACT

A single transformer converter which may switchably disconnect all of its converter outputs, or alternatively just some of the converter outputs. In some electronic systems this would allow the turning-off of some units, such as printers, while leaving on other units, such as a CPU or a twenty-four hour clock. Further, an uninterruptible output is provided by the converter to maintain applications and operating systems software stored a CMOS RAM even in the event of a power outage.

11 Claims, 2 Drawing Sheets

SELECTIVE OUTPUT DISCONNECT FOR A SINGLE TRANSFORMER CONVERTER

BACKGROUND OF THE INVENTION

The present invention relates to a power supply, and more particularly to a power supply having multiple output voltages of which one or more output voltages may be selectively disconnected from the circuit that they are powering.

It is known to use two separate power converters to supply power to an electronic system. In this known case, the electronic system has a first converter which is of the switching power supply type with multiple voltage outputs. As is common in many switching type converters, the voltage outputs may be disconnected or turned OFF by disabling a pulse width modulated drive signal that drives the power switching transistors to provide the output voltage level. An externally accessible switch logically enables or disables the pulse width modulating signal to provide the switching of the power transistors.

This known case also has a second converter which is of the half wave rectifier type. The second converter has a transformer with a single primary winding and a single secondary winding. The primary winding is connected to an a. c. line voltage and the secondary winding is connected to a half wave rectifier. The half wave rectifier converts the transformed a. c. voltage and current into pulsating d. c. voltage and current. The pulsating d. c. voltage and current are smoothed by some type of filter, such as a inductor-capacitor filter or a simple capacitor filter. The smoothed d. c. voltage and current are then supplied as outputs via conductors attached across the filter capacitor.

The electronic system, that these two converters supply with power, has a CMOS random access memory. Since this CMOS RAM contains program and/or other important information, it is desirable to make the CMOS RAM non-volatile by the connection of an uninterrupted supply of voltage from the previously described, second converter or a back-up battery. The second converter of this electronic system is designed to be continuously connected to the CMOS RAM to maintain the data therein. To this end, the switching converter and its multiple outputs are designed to be turned OFF, for example at the end of the business day, but the program and other important information are designed to be safely maintained via continuously powering the CMOS RAM of the system.

The battery is included to provide back-up power during a power outage. Upon such an outage, the battery powers the RAM until a. c. line power is restored or the battery is discharged. Thus, the second converter, while it is operating, keeps the battery from discharging. The second converter thereby preserves the power of the battery for those emergency situations when it is required.

The problems of this known two converter supply arrangement are that the two separate converters are expensive to manufacture, expensive to connect, and occupy excessive amounts of printed circuit board area. The solution to these problems must include the condition that any replacement converter power supply design has the same ability to switchably disconnect a set of multiple outputs (i.e. turn them OFF) and to continuously power a RAM as the known two converter power supply has.

SUMMARY OF THE INVENTION

According to one aspect of the invention, the foregoing problems are solved by providing a power supply having a single converter that occupies less printed circuit board area than the two separate converter arrangement. This single converter provides a set of multiple outputs which may be switchably disconnected from the electronic circuits that they supply with power. The single converter additionally has a unswitched output that continuously powers a back-up battery that is connected to a random access memory when the converter is connected to a. c. line power. Thus, this single converter has a set of multiple outputs that may be switchably disconnected to remove power from most of an electronic system, and an unswitched output that powers a back-up battery and a memory to retain the information stored in the memory without discharging the back-up battery.

In particular, the known problems are solved by providing a multiple output power supply converter including a single transformer having a primary winding and a plurality of secondary windings. A first winding of the plurality of secondary windings has an a. c. voltage that is selected to provide a level of voltage sufficient to power a memory upon conversion of the a. c. voltage to a d. c. voltage. The first winding has a first lead connected to an input of a first rectifier that converts the a. c. voltage and current to pulsating d. c. voltage and current. An output of the first rectifier is connected to a first filter which includes a first capacitor across which a smoothed d. c. voltage is developed of sufficient level to power the memory as a first of multiple power converter outputs. A second winding of the secondary windings has an a. c. voltage that is greater than that of the other secondary windings. This second winding has a first lead that is connected to an input of a second rectifier that converts the a. c. voltage and current to a pulsating d. c. voltage and current. An output of the second rectifier is connected to a second filter which has a first capacitor and a second capacitor across which a smoothed d. c. voltage is developed as a second of the multiple power converter outputs. An N-channel FET has its drain connected to a more positive of the first capacitor of the second filter, and its source connected to a more positive lead of the second filter capacitor of the second filter. Each of the more negative leads of the filter capacitors is connected to a common return of the rectifiers. A third rectifier has its input lead connected to the same end of the second winding that the second rectifier is connected to. An output of this third rectifier is connected to a peak detector filter which has a first resistor having a first lead that is connected to the peak detector rectifier output and a second lead that is connected to a peak charging capacitor. The peak charging capacitor has its more positive lead connected to the second lead of the first resistor and its more negative lead connected to the common return of the rectifiers. The first resistor resistance and the peak charging capacitor capacitance are sized such that the voltage developed across the peak charging capacitor during operation is substantially equal to a positive peak voltage of the second winding. A second resistor has a first lead connected to the more positive lead of the peak charging capacitor, and a second lead that is connected to a first lead of a third resistor forming a junction point. The third resistor has a second lead that is connected to a gate of an N-channel FET. A pull down device is connected to the junction point for pulling down the voltage thereat to the level of the common return. A control device for controlling the pull down device is connected across the filter capacitor of the first filter circuit, and receives control voltage and current from the filter capacitor. When the voltage at the junction point is not pulled down, the gate of the N-channel FET is driven by substantially the peak voltage of the peak charging capacitor and the N-channel FET is turned ON to supply voltage and current from the second rectifier and the first capacitor to the second capacitor of the second filter and the electronic system connected thereto. On the other hand, when the voltage at the junction point is pulled down, the gate is driven by substantially zero volts and the N-channel FET is turned OFF which disconnects the voltage and current from the second rectifier and the first capacitor of the second filter to the second capacitor of the second filter and the electronic system connected thereto.

It is, therefore, an object of the present invention to provide a power supply having a single converter which occupies less printed circuit board area than multiple power supply converters having equivalent output characteristics.

It is another object of the present invention to provide a power supply converter that is less expensive to manufacture.

These and other objects of the present invention will be apparent from the following description and the attached drawings.

DETAILED DESCRIPTION OF A PREFERRED EMBODIMENT

Figure 1:
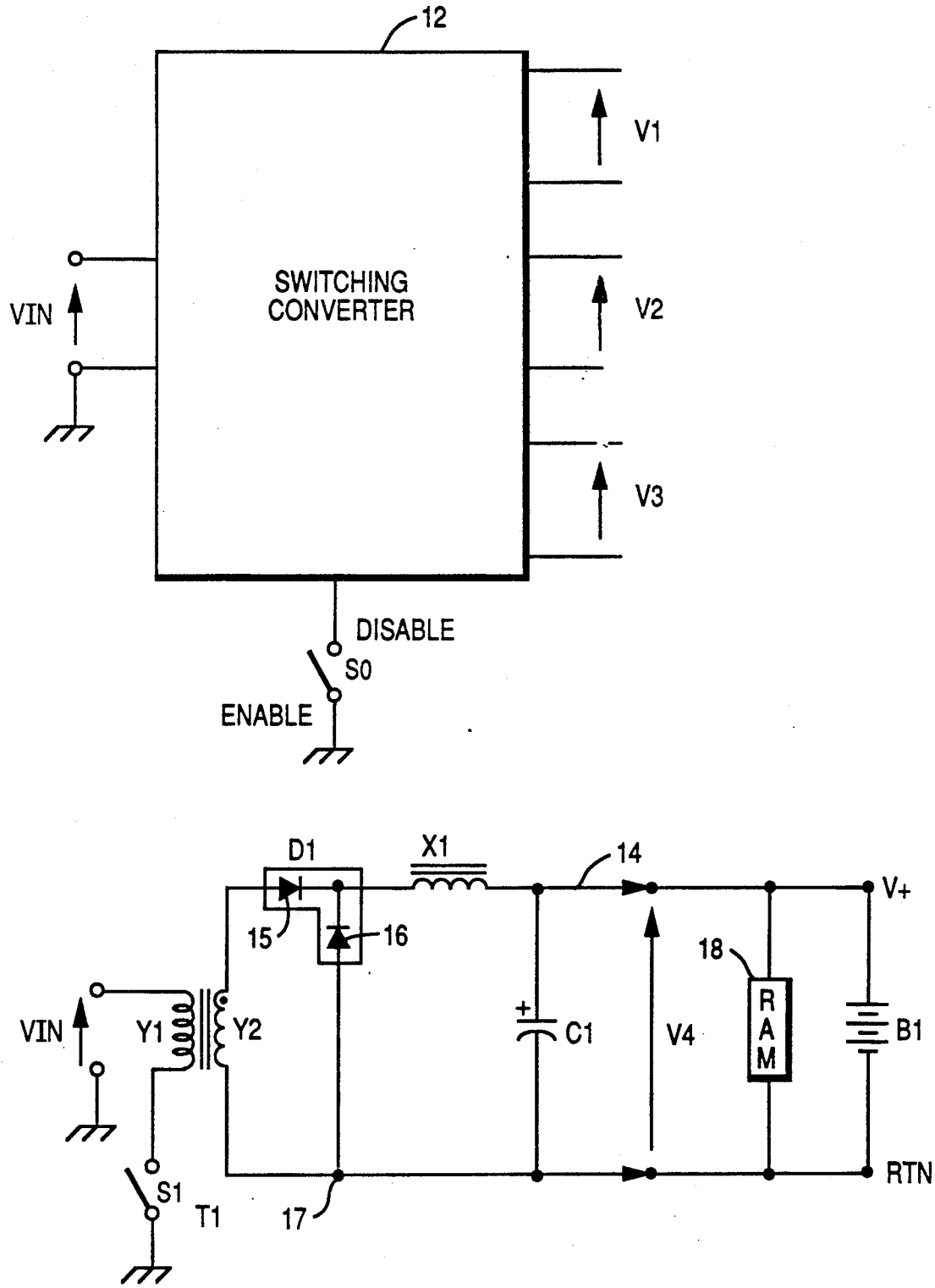
FIG. 1 is a schematic diagram showing a known two converter power supply arrangement.

Referring to FIG. 1, a schematic diagram of the previously mentioned known two converter power supply 10 is shown. A first converter 12 is of the switching type. Switching converters derive their voltage and current from a. c. line power VIN, and use power switching transistors or similar devices to regulate the output voltages and currents that they supply. The outputs are usually regulated by pulse width modulation of a d. c. voltage and current, and are subsequently transformed, rectified and filtered to provide supplies of current at the multiple output voltages V1, V2 and V3. By pulse width modulating of the drive signal to the power switching transistors, the multiple output voltages V1, V2, and V3 may be controlled. Further, by logically disabling the pulse width modulating drive signal, through operation of the switch S0 to the disable position, the drive signal and thereby the multiple output voltages V1, V2, and V3 are effectively disconnected.

A second converter 14 has a transformer T1 with a primary winding Y1 and a secondary winding Y2. The primary winding Y1 is connected to the a. c. line voltage, VIN. The secondary winding Y2 has one end connected to an input of a diode network D1 and a second end is connected to a second input of the diode network D1. The diode network D1 has a series half wave rectifier diode 15 and a free wheeling diode 16, (the purpose of which will be explained below). In the arrangement shown in FIG. 1, the second end of Y2 is connected to the second input of D1 as a circuit return. However, those skilled in the art will recognize that this might not be the case if the converter arrangement of FIG. 1 were modified for another type of diode network, such as a full wave bridge. For full wave bridge networks, an analogous design would have the second end of secondary winding Y2 connected to one of the two bridge inputs and the more negative bridge output would be connected, in such a case, as the circuit return.

Diode network D1 has the half wave series rectifier diode 15 having its anode connected as the first, more positive input. The cathode of the diode 15 is connected as the more positive output. A common return line 17 operates as the less positive input and output of the diode network D1. Between the two outputs of the diode network D1, the free wheeling diode 16 is connected with its cathode connected to the more positive output and its anode connected to the less positive output, i.e. the common return 17. The free wheeling diode 16 short circuits any reverse voltage impulses induced by the pulsating current of the half wave rectifier flowing through inductances of the downstream circuit. The outputs of the diode network D1 are connected to an inductor-capacitor filter consisting of an inductor X1 and a capacitor C1. The pulsating d. c. voltage and current from the diode network D1 are smoothed by the inductor X1 and the capacitor C1 such that a smoothed d. c. voltage V4 is developed across the capacitor C1. The output voltage V4 is sufficiently smooth and of a sufficient level to power a RAM 18.

Also attached across the capacitor C1 is a back-up battery B1. The back-up battery B1 provides emergency power for the RAM 18 in the event that the output voltage and current from diode network D1 should be interrupted for example by a power outage. Battery B1 may be of the rechargeable type, in which case V4 charges battery B1 up and keeps it from discharging. Alternately, battery B1 may be nonrechargeable, in which case the presence of V4 at its proper level keeps the battery B1 from discharging.

Thus, the second power converter 14 converts power from the level of the a. c. line voltage VIN to a level which powers the random access memory 18 and keeps the battery B1 from discharging. The power converter 14, because it is separate from the power switching converter 12, is available to power the RAM 18 even during those periods when the power switching converter 12 is disconnected.

Figure 2:
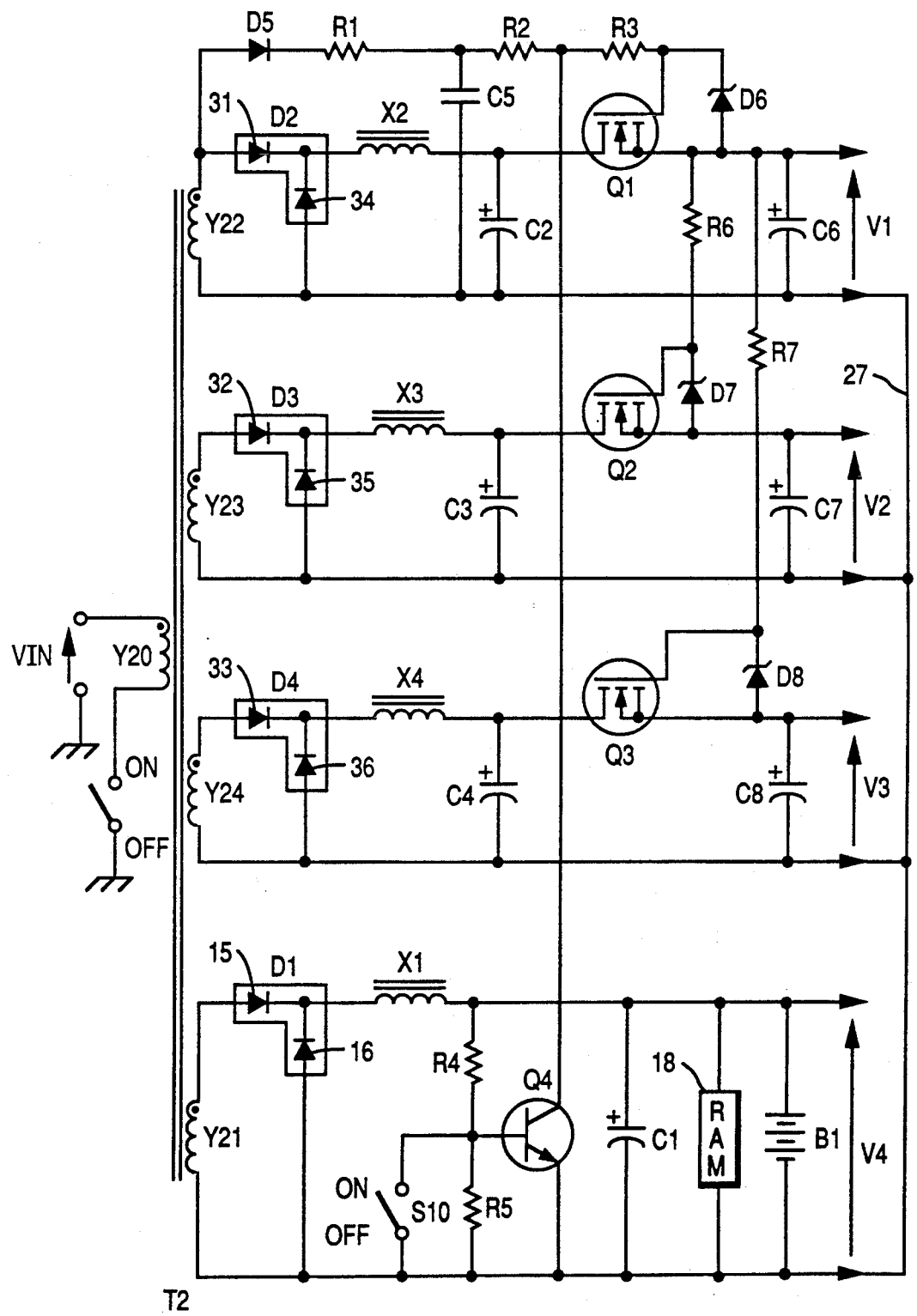
FIG. 2 is a schematic diagram showing a power supply converter in accordance with the present invention.

Referring now to FIG. 2, a schematic diagram of a single converter power supply 20 according to the present invention is shown. The single converter power supply 20 provides all of the output voltages, currents and disconnecting functions that are available from the two converter power supply 10 described previously.

The single converter power supply 20 has a single transformer T2. The transformer T2 has a primary winding Y20 and multiple secondary windings Y21, Y22, Y23 and Y24. The primary winding Y20 of transformer T2 must receive and transform substantially the same amount of power from the a. c. line voltage VIN as the combined power received by switching converter 12 and rectifier converter 14 shown in FIG. 1. To this end, the constituent parts of the transformer T2, e.g. the core and the conductors, are selected such that the voltage and power levels, previously supplied by the outputs V1-V4 by the two converter power supply 10, are provided by the single converter power supply 20.

The secondary winding Y21 has substantially the same characteristics as the secondary Y2 described above in regard to FIG. 1. The ends of the secondary winding Y21 are connected to its diode network D1 in the same way that Y2 is connected to its diode network D1. Similarly, the outputs of the diode network D1 are connected to a reactor X1, a filter capacitor C1, a backup battery B1, and a random access memory 18 as the correspondingly designated components shown in FIG. 1 are. The additional components shown in FIG. 2 connected across the filter capacitor C1, i.e. R4, R5, and Q4, will be described later.

The secondary windings Y22, Y23, and Y24 each have one end connected to a respective input terminal of diode networks D2, D3, and D4. A second end of each of the windings Y22, Y23, and Y24 is connected to a second input terminal of the diode networks D2, D3, and D4 respectively. In the preferred embodiment of the invention the second ends of the secondary windings Y22, Y23, and Y24 are connected to a common return line 27. Further, in the preferred embodiment, the common return line 27 of the secondary windings Y22, Y23 and Y24 is connected to the more negative output of diode network D1 to provide a common return line for all of the converters. However, those skilled in the art will appreciate that this might not be the case if diode networks D2, D3, and D4 were full wave bridges instead of the half wave rectifiers. For full wave bridge networks (not shown), each corresponding converter would have its second secondary end connected to one of the bridge inputs and its more negative output connected to a common return line.

Diode networks D2, D3, and D4 have half wave series rectifier diodes 31, 32, and 33. Each diode 31-33 has a respective anode as a first input connection to its respective network D2-D4. Further, each diode 31-33 has its cathode as a respective more positive output of each diode network D2-D4. The common return line 27 functions as the less positive output of each diode network D2-D4. Between the outputs of each diode network D2-D4, a respective free wheeling diode 34-36 is connected. Each free wheeling diode 34-36 has its cathode connected to the more positive output of its respective diode network D2-D4 and its anode connected to the less positive output. Each free wheeling diode 34-36 short circuits any reverse voltage impulses induced by the pulsating current from the half wave rectified current flowing through inductances of the respective downstream circuit of the diode networks D2-D4.

Each output of each diode network D2-D4 is filtered. This filtering is provided by inductor-capacitor filters consisting of series inductors X2, X3, and X4 and capacitors C2, C3 and C4 respectively. The pulsating half wave peaks of d. c. voltage and current from the more positive output of each diode network D2, D3, and D4 are smoothed by a respective inductor X2, X3 and X4, connected in series therewith and further smoothed by a respective capacitor C2, C3, and C4. The more positive lead of each capacitor C2, C3, and C4 is connected to a respective output of its respective inductor X2, X3 and X4. Furthermore, the less positive lead of each capacitor C2, C3 and C4 is connected to the previously mentioned common return line 27.

Each capacitor C2, C3, and C4 is switchably connected through a respective N-channel field effect transistor (FETs) Q1, Q2 and Q3 to a respective parallel capacitor C6, C7, and C8. The FETs Q1, Q2, and Q3 switchably connect the voltage developed across the more positive leads of capacitors C2, C3, and C4 to respective more positive leads of parallel capacitors C6, C7 and C8. Thus, FETs Q1, Q2 and Q3 may switchably connect the respective voltages and currents of capacitors C2, C3 and C4 to the respective capacitors C6, C7, and C8, and to the electronic circuits connected thereto.

FET Q1 has its drain terminal connected to the more positive lead of the capacitor C2, and its source connected to the more positive lead of the capacitor C6. FET Q2 has its drain terminal connected to the more positive lead of the capacitor C3, and its source connected to the more positive lead of the capacitor C7. FET Q3 has its drain terminal connected to the more positive lead of the capacitor C4, and its source connected to the more positive lead of the capacitor C8. When the FETs Q1, Q2 and Q3 are turned ON, the parallel capacitors C2, C6; C3, C7; and C4, C8 operate to smooth the pulsating d. c. output of their respective inductors X2, X3 and X4 in a way that is well known in the art. These parallel capacitors C2-C6, C3-C7, and C4-C8 provide a high degree of smoothing for the d. c. outputs V1, V2, and V3 and the electronic circuits attached thereto.

Thus, capacitors C1, C2, C3, and C4 are connected between the inductors X1, X2, X3, and X4 and the common return point 27. In this manner, the multiple voltages all share a common circuit return.

To provide enough drive voltage for the gate of FET Q1, a half wave peak detector converter is connected to the secondary winding Y22 that has a secondary winding a. c. voltage that is greater than the a. c. voltages of the windings Y23 or Y24. The peak detector includes a diode D5 having its anode connected to the same first end of the secondary winding Y22 that the anode of the series half wave rectifier of diode network D2 is connected to. The cathode of the diode D5 is connected to a first lead of a resistor R1. The second lead of the resistor R1 is connected to a more positive lead of a capacitor C5. The more negative lead of capacitor C5 is connected to the common return line 27. A second resistor R2 has a first lead connected to the more positive lead of C5 and a second lead that forms a junction point with a first lead of a third resistor R3. A second lead of the third resistor R3 is connected to the gate of the FET Q1. Additionally, a zener diode D6 has its cathode connected to the gate and its anode connected to the source of FET Q1, which is the same as the more positive lead of output capacitor C6. The zener threshold voltage should be high enough so the gate voltage can drive the FET Q1 into the ON condition, and low enough to prevent the gate to source voltage rating from being exceeded.

As is known in the art, the voltage across peak charging capacitor C5 will be approximately the peak voltage (i.e. 1.414 times the r.m.s. voltage) of the secondary winding Y22. Capacitor C5 will charge up to this peak voltage if the current per cycle through R1 into capacitor C5 is less than the current per cycle from the capacitor C5 through R2. Since the gate of FET Q1 draws negligible current, the peak charging voltage can easily be determined by selecting values for R1, R2, R3 and D6 according to principles well known in the art.

To turn the FET Q1 OFF and disconnect the supply of power to electronic circuits attached across C6, an active pull down transistor Q4 is connected between the junction point of R2 and R3. Transistor Q4 is an NPN bipolar transistor, although those skilled in the art will appreciate that other devices such as a PNP bipolar transistor, a FET, a solid state relay, or an electromagnetic relay could be used as modifications of transistor Q4 within the scope of the present invention. The collector of Q4 is connected to the junction point of resistors R2 and R3. The emitter of Q4 is connected to the common return line 27. A resistor R4 has a first lead connected to the more positive lead of capacitor C1 and of the output to battery B1. A second lead of the resistor R4 is connected to the base of transistor Q4. Another resistor R5 has a first lead connected to the base of transistor Q4 and a second lead connected to the common return line 27. Resistors R4 and R5 divide the voltage V4 in a known way, and their resistances are selected such that the divided voltage at the base of Q4 will drive the collector-emitter junctions of Q4 into saturation. If transistor Q4 is saturated, the junction point of R2 and R3 is effectively short circuited to the return line 27. By short circuiting the first lead of R2 to the return line 27, the gate of FET Q1 becomes more negative than its source. With its gate more negative than its source FET Q1 is turned OFF.

A switch S10 is connected between the base of transistor Q4 and the return line 27. When the switch S10 is open, transistor Q4 is saturated and FET Q2 is turned OFF. When the switch S10 is closed, the switch S10 essentially short circuits the base of transistor Q4 to its emitter and thereby drives the transistor Q4 into cutoff. If transistor Q4 is in cutoff, the junction point of resistors R2 and R3 is not short circuited, and FET Q1 is driven to the ON condition by the peak charging voltage as previously described. Thus, the output voltage V1 may be selectively connected or disconnected from its supply of d. c. voltage and current by the operation of switch S10.

The embodiment shown in FIG. 2 has resistors R6 and R7 that have their respective first leads connected to the more positive lead capacitor C6, across which the output voltage V1 is developed, and their second leads connected to the gates of FET Q2 and FET Q3 respectively. Zener diodes D7 and D8 have their respective cathodes connected to the gates of FET Q2 and FET Q3 respectively, and their respective anodes to the sources of FET Q2 and FET Q3 respectively. Thus, when the output voltage V1 is developed across C6, i.e. because FET Q1 has been turned ON, FETs Q2 and Q3 also have their gates driven such that they are also turned ON. When FETs Q2 and Q3 are turned ON, voltages V2 and V3 are developed respectively across C7 and C8. On the other hand, when the voltage V1 across capacitor C6 collapses, i.e. because FET Q1 has been turned OFF, FETs Q2 and Q3 will be turned OFF as well. With FETs Q2 and Q3 turned OFF, V2 across C7 and V3 across C 8 will collapse as V1 collapsed.

Thus, it will now be understood that there has been disclosed a single transformer converter which provides for disconnection of all of the power outputs, or a selected sub group of the power outputs. For example, it is often desirable in digital computing equipment to disconnect power to the processor and display portions, but to maintain power to a portion of memory to save the data stored therein and to keep the battery back up power therein from being consumed. While the invention has been particularly illustrated and described with reference to a preferred embodiment thereof, it will be understood by those skilled in the art that various changes in form, details, and applications may be made therein. For example, additional secondary windings that have switchably disconnecting circuits such as those providing V2 and V3 may be included. It is accordingly intended that the appended claims shall cover all such changes in form, details and applications which do not depart from the true spirit and scope of the invention.

What is claimed as new and desired to be secured by Letters Patent of the United States is:

1. A multiple output voltage power converter, comprising:
    a single transformer having a primary winding, a first secondary-winding and a second secondary-winding;
    first conversion means connected to said first secondary-winding for converting a voltage from said first secondary-winding into an uninterruptible supply of voltage for a RAM;
    said first conversion means having a battery to provide said uninterruptible supply of power to said RAM during a temporary line power outage;
    second conversion means connected to said second secondary-winding for converting a voltage of said second secondary-winding to provide a disconnectable supply of voltage;
    third conversion means also connected to said second secondary-winding for converting said voltage of said second secondary-winding to provide a control voltage that is substantially equal to a peak voltage of said second secondary-winding and is greater than than a voltage of said second conversion means;
    disconnection means connected in series with said second conversion means for connecting said disconnectable supply of voltage to a load if driven by said control voltage, and disconnecting said disconnectable supply of voltage from the load if not driven by said control voltage; and
    switch means connected to said uninterruptible supply of voltage for switching said control voltage to drive or not to drive said disconnection means;
    whereby said disconnectable supply of voltage is connected to the load by said disconnection means whenever said disconnection means is driven by said control voltage, and is disconnected from said load by said disconnection means whenever said disconnection means is not driven by said control voltage.

2. The multiple output voltage power converter, according to claim 1, further comprising:
    fourth conversion means connected to a third secondary-winding for converting a voltage of said third secondary-winding to provide a second disconnectable supply of voltage;
    second disconnection means connected in series with said fourth conversion means for connecting said second disconnectable supply of voltage to a second load if driven by said control voltage and disconnecting said second disconnectable supply of voltage from said second load if not driven by said control voltage; and
    second switch means connected to said uninterruptible supply of voltage for switching said control voltage to drive or not to drive said second disconnection means;
    whereby said second disconnectable supply of voltage is connected to said second load by said second disconnection means whenever said second disconnection means is driven by said control voltage, and is disconnected from said second load by said second disconnection means whenever said second disconnection means is not driven by said control voltage.

3. The multiple output voltage power converter, according to claim 1, further comprising:
fourth conversion means connected to a third secondary-winding for converting a voltage of said third secondary-winding to provide a second disconnectable supply of voltage; and
second disconnection means connected in series with said fourth conversion means for connecting said second disconnectable supply of voltage to a second load if driven by the first disconnectable supply of voltage, and disconnecting said second disconnectable supply of voltage from said second load if not driven by said the first disconnectable supply of voltage;
said second disconnection means is connected to the first disonnectable supply of voltage at the output of the first disconnection means;
whereby said second disconnectable supply of voltage is connected to a second load by said second disconnection means whenever said second disconnection means is driven by said first disonnectable voltage via said first disconnection means, and is disconnected from said second load by said second disconnection means whenever said second disconnection means is not driven by said first disconnectable voltage.

4. A multiple output power supply converter, comprising:
a single transformer including a primary winding and a plurality of secondary windings;
a first winding of said secondary windings having an a. c. voltage that is selected to provide a level of voltage sufficient to charge a battery upon conversion of said a. c. voltage to a d. c. voltage;
said first winding having a first lead connected to an input of a first rectifier;
an output of said first rectifier is connected to a first filter including a first capacitor across which a smoothed d. c. voltage is developed of sufficient level to charge said battery as a first of said multiple power supply outputs;
a second winding of said secondary windings having an a. c. voltage that is greater than any of the other secondary windings;
said second winding having a first lead connected to an input of a second rectifier;
an output of said second rectifier is connected to a second filter including a first and second capacitors across which a smoothed d. c. voltage is developed as a second of said multiple power supply outputs;
a transistor having its drain electrode connected to a more positive lead of said first capacitor of said second filter and a source lead connected to a more positive lead of said second filter capacitor;
each more negative lead of said filter capacitors is connected to a common return terminal of said rectifiers;
a third rectifier having an input lead connected to said one lead of said second winding that said second rectifier is connected to;
an output of said third rectifier is connected to a third filter which is a peak detector filter, said third filter including:
a first resistor having a first lead connected to said third rectifier output and a second lead; and
a peak charging capacitor of said third filter having a more positive lead connected to said second lead of said first resistor and a more negative lead connected to said common return terminal of said rectifiers;
said first resistor resistance and said peak charging capacitor capacitance are sized such that the voltage developed across said peak charging capacitor during operation is substantially equal to a positive peak of said a. c. voltage of said second winding;
a second resistor has a first lead connected to said more positive lead of said peak charging capacitor and a second lead connected to the control electrode of said transistor forming a junction point;
means connected to said junction point for pulling down a voltage thereof to that of said common terminal of said rectifiers; and
means for controlling said pulling down means connected across said filter capacitor of said first filter circuit and receiving control voltage and current therefrom;
whereby, if said junction point is not pulled down, said control electrode of said transistor is driven by substantially the peak voltage of said peak charging capacitor and said transistor is turned on to supply voltage and current from said second rectifier and said first capacitor to said second capacitor of said second filter and said second of said multiple power supply outputs, and if said junction point is pulled down, said control electrode is driven by substantially zero volts and said transistor is turned off to disconnect voltage and current from said second rectifier and said first capacitor of said second filter to said second capacitor and said second of said multiple power supply outputs.

5. A multiple output power supply converter, comprising:
a single transformer including a primary winding and a plurality of secondary windings;
a first winding of said secondary windings having an a. c. voltage that is selected to provide a level of voltage sufficient to charge a battery upon conversion of said a. c. voltage to a d. c. voltage;
said first winding having a first lead connected to an input of a first rectifier which converts the a. c. voltage and current to pulsating d. c. voltage and current;
an output of said first rectifier is connected to a first filter including a first capacitor across which a smoothed d. c. voltage is developed of sufficient level to charge said battery as a first of said multiple power supply outputs;
a second winding of said secondary windings having an a. c. voltage that is greater than any of the other secondary windings;
said second winding having a first lead connected to an input of a second rectifier which converts the a. c. voltage and current to a pulsating d. c. voltage and a pulsating d. c. current;
an output of said second rectifier is connected to a second filter including a first and second capacitors across which a smoothed d. c. voltage is developed as a second of said multiple power supply outputs;

an N-channel FET having a drain lead connected to a more positive lead of said first capacitor of said second filter and a source lead connected to a more positive lead of said second filter capacitor;

each more negative leads of said filter capacitors is connected to a common return terminal of said rectifiers;

a third rectifier having an input lead connected to said one lead of said second winding that said second rectifier is connected to;

an output of said third rectifier is connected to a third filter which is a peak detector filter, said third filter including:

a first resistor having a first lead connected to said peak detector rectifier output and a second lead; and a peak charging capacitor of said third filter having a more positive lead connected to said second lead of said first resistor and a more negative lead connected to said common return terminal of said rectifiers;

said first resistor resistance value and said peak charging capacitor capacitance value are sized such that the voltage developed across said peak charging capacitor during operation is substantially equal to a positive peak of said a. c. voltage of said second winding;

a second resistor has a first lead connected to said more positive lead of said peak charging capacitor and a second lead;

a third resistor having a first lead connected to said second lead of said second resistor at a junction point and a second lead connected to a gate lead of said N-channel FET;

means connected to said junction point for pulling down a voltage thereof to that of said common terminal of said rectifiers; and means for controlling said pulling down means connected across said filter capacitor of said first filter circuit and receiving control voltage and current therefrom;

whereby, if said junction point is not pulled down, said gate lead of said N-channel FET is driven by substantially the peak voltage of said peak charging capacitor and said N-channel FET is turned on to supply voltage and current from said second rectifier and said first capacitor to said second capacitor of said second filter and said second of said multiple power supply outputs, and if said junction point is pulled down, said gate lead is driven by substantially zero volts and said N-channel FET is turned off to disconnect voltage and current from said second rectifier and said first capacitor of said second filter to said second capacitor and said second of said multiple power supply outputs.

6. The multiple output power supply converter, according to claim 5, further comprising a zener diode having a cathode connected to said gate lead and an anode connected to said more positive lead of said second capacitor of said second filter thereby limiting the voltage at said gate lead to the zener voltage above the voltage of said source lead.

7. The multiple output power supply converter, according to claim 5, wherein said pulling down means is a bipolar transistor connected between said junction point and said common terminal such that current will flow from the junction point through the collector and emitter of the bipolar transistor and into the common terminal of the rectifiers if the base terminal is driven with sufficient voltage to turn said bipolar transistor on.

8. The multiple output power supply converter, according to claim 5, further comprising a reactor connected between said second rectifier and said first capacitor as part of said second filter.

9. The multiple output power supply converter, according to claim 6, further comprising:

a third winding of said plurality of secondary windings having a secondary voltage that is less than said second winding;

said third winding having a first lead connected to an input of a fourth rectifier which converts the a. c. voltage and current to pulsating d c. voltage and current;

an output of said fourth rectifier is connected to a fourth filter including a first and a second capacitors across which another smoothed d. c. voltage is developed as a third of said multiple power supply outputs;

a second N-channel FET having a drain lead connected to a more positive lead of said first capacitor of said fourth filter and a source lead connected to a more positive lead of said second capacitor of said fourth filter;

each more negative lead of said capacitors of said fourth filter is connected to said common return terminal of said rectifiers;

a sixth resistor having a first lead connected to the more positive lead of the second capacitor of said second filter and a second lead connected to a gate lead of said second FET; and a second zener diode having a cathode connected to said gate lead of said second FET and an anode connected to said source lead of said second FET thereby limiting the voltage at said gate lead to the zener voltage of said second zener diode above the voltage of said source lead of said second N-channel FET;

whereby, if said junction point is not pulled down, said gate lead of said first N-channel FET is driven by the lesser of the peak voltage of said peak charging capacitor or the second power supply output voltage plus the first zener voltage and said first N-channel FET is turned on to supply voltage and current from said second rectifier and said first capacitor to said second capacitor of said second filter and said gate lead of said second N-channel FET is driven by the lesser of the second power supply output voltage or the third power supply output voltage plus the second zener voltage and said second N-channel FET is turned on to supply voltage and current from said fourth rectifier and said first capacitor to said second capacitor of said fourth filter, and if said junction point is pulled down, said gate leads are reverse biased with respect to their respective sources by the forward voltage drops across their respective zener diodes turning said N-channel FETs off to disconnect their voltages and currents from said second and fourth rectifiers and said first capacitors of said second and fourth filters to the second capacitors thereof.

10. The multiple output power supply converter, according to claim 7, wherein:

said the base terminal is connected through a fourth resistor to the more positive side of the capacitor of said first filter and through a fifth resistor to said common point of said rectifiers, said fourth and fifth resistors forming a voltage divider having sufficient voltage and current to turn said bipolar transistor on; and said base terminal is connected through a switch to said common point of said rectifiers such that when said switch is closed, said base voltage is substantially zero and said bipolar transistor is off.

11. The multiple output power supply converter, according to claim 9, further comprising a second reactor connected between said fourth rectifier and said first capacitor of said fourth filter as a part thereof.

* * * * *